(12) United States Patent
Neubrand

(10) Patent No.: US 7,581,777 B2
(45) Date of Patent: Sep. 1, 2009

(54) HEADER LATCH ASSEMBLY FOR CONVERTIBLE TOPS

(75) Inventor: Frank Neubrand, West Bloomfield, MI (US)

(73) Assignee: Wilhelm Karmann GmbH, Osnabruck (DE)

( * ) Notice: Subject to any disclaimer, the term of this patent is extended or adjusted under 35 U.S.C. 154(b) by 307 days.

(21) Appl. No.: 11/616,605

(22) Filed: Dec. 27, 2006

(65) Prior Publication Data

US 2008/0122248 A1 May 29, 2008

Related U.S. Application Data

(60) Provisional application No. 60/867,309, filed on Nov. 27, 2006.

(51) Int. Cl.
*B60J 7/185* (2006.01)

(52) U.S. Cl. .................................. 296/121; 292/DIG. 5

(58) Field of Classification Search ................. 296/121, 296/107.07, 132, 224, 120.1; 292/DIG. 5
See application file for complete search history.

(56) References Cited

U.S. PATENT DOCUMENTS

| | | | | |
|---|---|---|---|---|
| 2,586,648 | A * | 2/1952 | Hale et al. ............... | 296/120.1 |
| 2,785,914 | A * | 3/1957 | Thomas et al. ............. | 292/7 |
| 3,857,603 | A * | 12/1974 | Jardin ...................... | 296/224 |
| 5,839,778 | A * | 11/1998 | Schaible et al. ............ | 296/224 |
| 6,672,646 | B2 * | 1/2004 | Obendiek .................. | 296/121 |
| 6,758,511 | B2 * | 7/2004 | Taylor et al. .............. | 296/121 |
| 6,834,907 | B2 * | 12/2004 | Dietl ........................ | 296/121 |
| 6,953,217 | B2 * | 10/2005 | Hasselgruber et al. ...... | 296/121 |
| 7,434,866 | B2 * | 10/2008 | Quindt et al. .............. | 296/121 |
| 2001/0005090 | A1 * | 6/2001 | Haberl et al. ............... | 296/121 |
| 2002/0185887 | A1 * | 12/2002 | Hasselgruber et al. ...... | 296/121 |
| 2003/0141741 | A1 * | 7/2003 | Obendiek .................. | 296/121 |
| 2008/0067833 | A1 * | 3/2008 | Quindt et al. .............. | 296/121 |
| 2008/0122249 | A1 * | 5/2008 | Habacker ................... | 296/121 |

\* cited by examiner

*Primary Examiner*—Jason S Morrow
(74) *Attorney, Agent, or Firm*—Gifford Krass, Sprinkle, Anderson & Citkowski, P.C.

(57) ABSTRACT

A latch assembly allows a first part and a second part of a convertible top system to be latched together. The latch assembly includes a pair of latch mechanisms disposed on the first part. Each latch mechanism has a hook movable between a locked position engaged with a receiver on the second part to latch the first and second parts together and an unlocked position disengaged from the receiver to unlatch the first and second parts from each other. The latch assembly also includes an actuating mechanism disposed on the first part between the latch mechanisms for moving the hooks between the locked and unlocked positions. The actuating mechanism includes a multi-link assembly movable to a dual overcenter position for maintaining the hooks in the locked position.

20 Claims, 4 Drawing Sheets

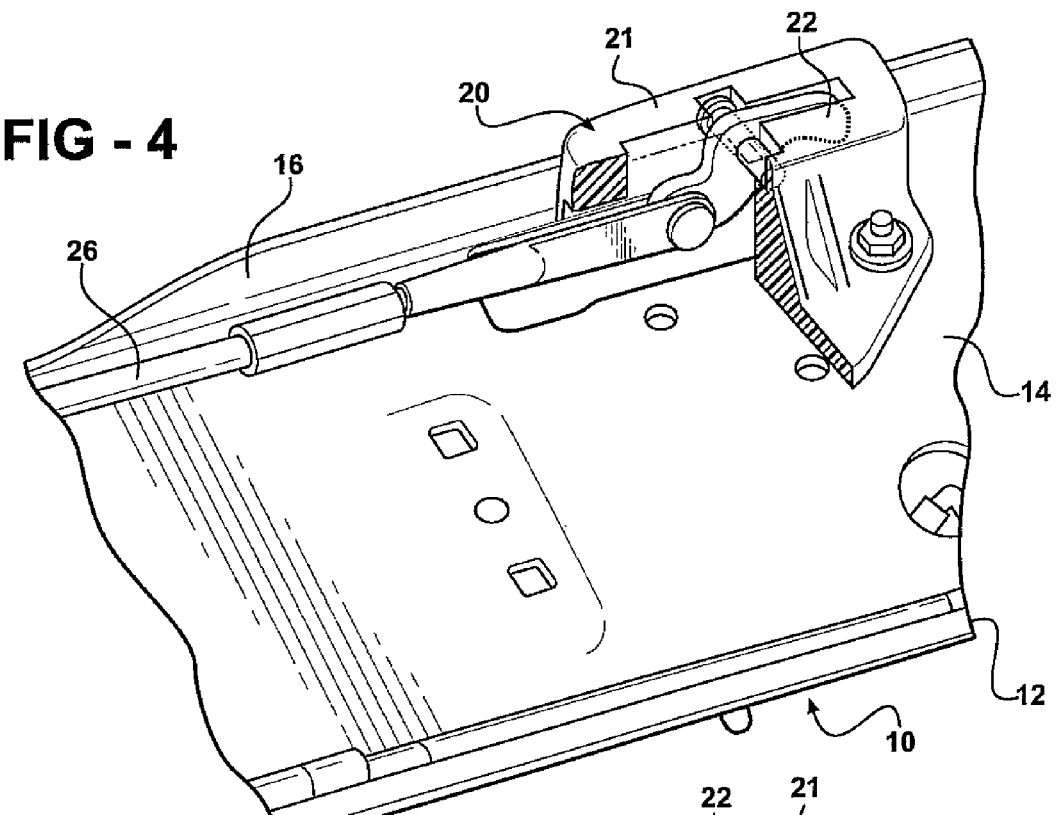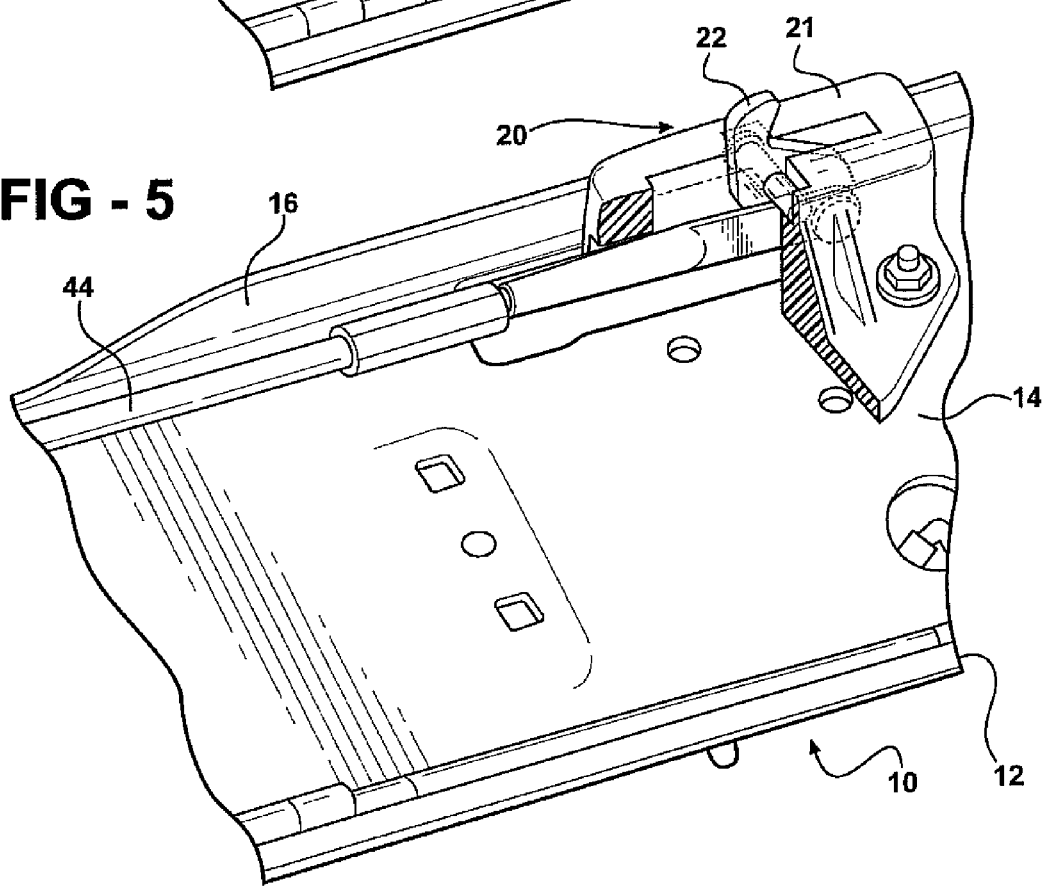

HEADER LATCH ASSEMBLY FOR CONVERTIBLE TOPS

REFERENCE TO RELATED APPLICATIONS

This application claims priority to U.S. Provisional Patent Application Ser. No. 60/867,309, filed Nov. 27, 2006, the entire contents of which are incorporated herein.

FIELD OF THE INVENTION

The invention relates to a header latch assembly for releasably locking a forward end of a convertible top to a windshield header. More particularly, the invention relates to a header latch assembly utilizing a scissor-type linkage mechanism for actuating pivoting latch hooks.

BACKGROUND OF THE INVENTION

Convertible vehicles include convertible tops that are moveable between an extended position and a retracted position. In the extended position, a front portion of the convertible top is aligned with a header portion of a windshield. Locking or latching devices are widely known in the art for locking the front portion of the convertible top against the header portion of the windshield. Typically, these latching mechanisms are either manually or electric-motor driven. The bulk of the latching mechanism is typically disposed along the header portion of the windshield.

It always remains desirable to provide a latching mechanism that is cheaper, lighter, easier to assemble and/or more robust over conventional latching assemblies. It is also becoming increasingly important to provide a latching assembly that is more compact in terms of packaging size, in order to allow the new design of a header portion or windshield having a slim profile. The slim profile allows the design of a more aerodynamically efficient vehicle.

SUMMARY OF THE INVENTION

According to one aspect of the invention, a latch assembly is provided for latching together a first part and a second part of a convertible top system of an automotive vehicle, wherein at least a portion of the convertible top system is movable between an extended position for covering a passenger compartment and a retracted position disposed in a storage space behind the passenger compartment. The latch assembly includes a pair of latch mechanisms disposed on the first part. Each latch mechanism has a hook movable between a locked position engaged with a receiver on the second part to latch the first and second parts to-ether and an unlocked position disengaged from the receiver to unlatch the first and second parts from each other. The latch assembly also includes an actuating mechanism disposed on the first part between the latch mechanisms for moving the hooks between the locked and unlocked positions. The actuating mechanism includes a multi-link assembly movable to a dual overcenter position for maintaining the hooks in the locked position.

BRIEF DESCRIPTION OF THE DRAWINGS

Advantages of the present invention will be readily appreciated as the same becomes better understood by reference to the following detailed description when considered in connection with the accompanying drawings, wherein:

FIG. 4 is an enlarged perspective view of a portion of the header latch assembly of FIG. 2 in the locked position; and FIG. 5 is an enlarged perspective view of a portion of the header latch assembly of FIG. 2 in the unlocked position.

DETAILED DESCRIPTION OF THE PREFERRED EMBODIMENTS

Figure 1:
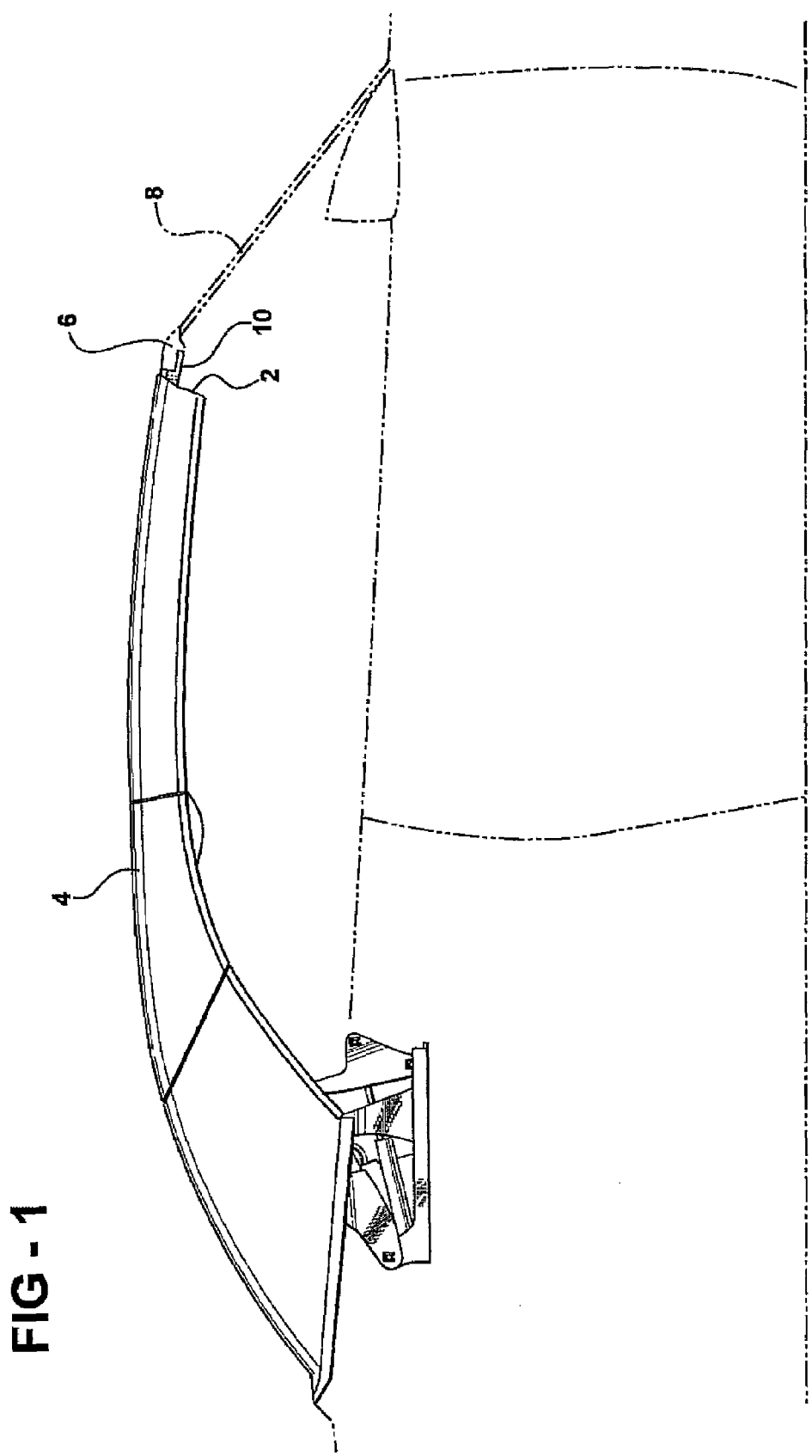
FIG. 1 is a side elevational view of an automotive vehicle having a convertible top and header latch assembly according to an embodiment of the invention.

Referring to FIG. 1, an automotive vehicle is shown with a convertible top 4 in an extended or closed position with its forward end 2 abutting a header portion 6 of a windshield 8. Described in greater detail below, the invention provides a header latch assembly for selectively locking the forward end 2 of the top 4 to the header portion 6 of the windshield 8.

Figure 2:
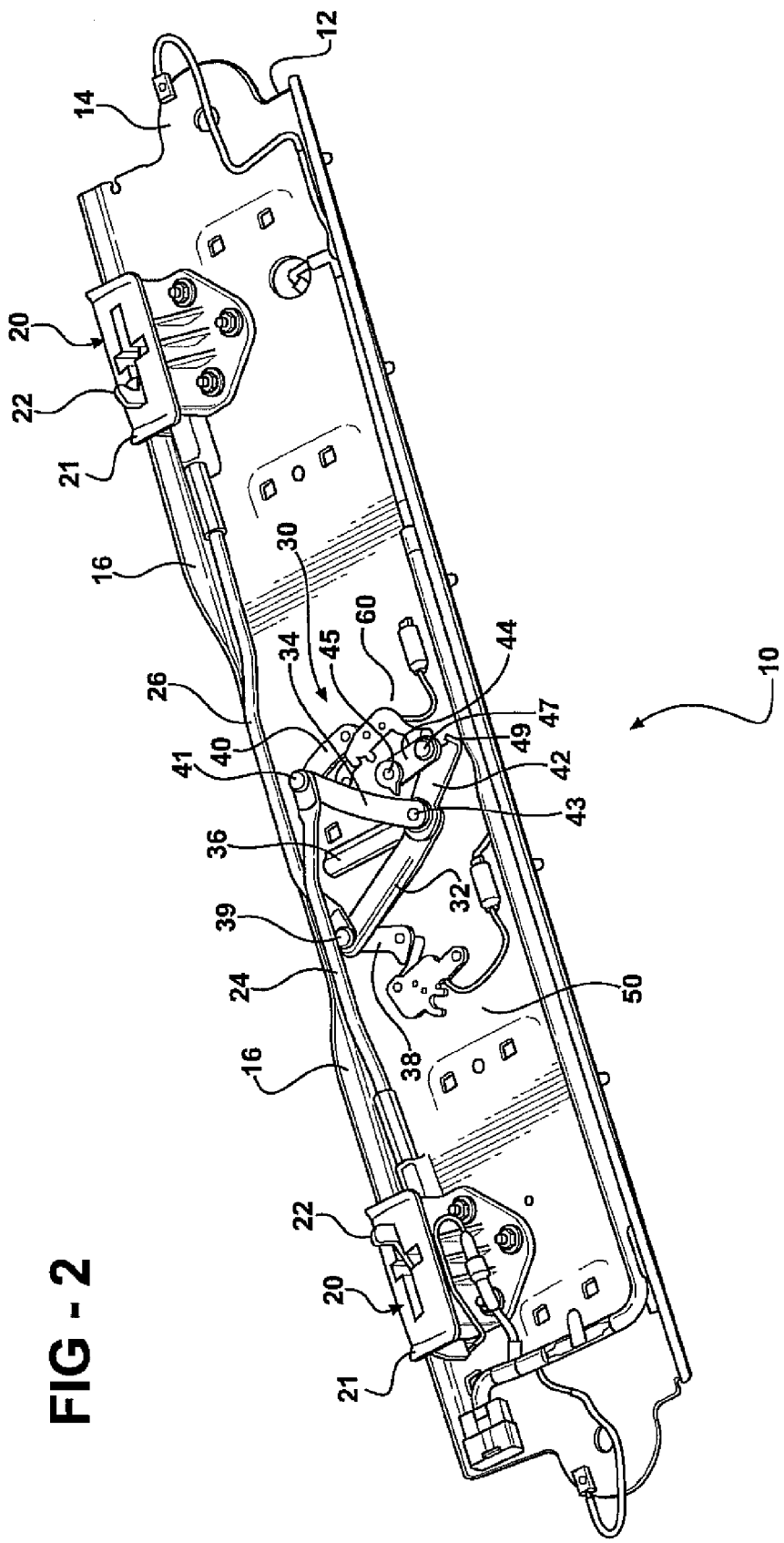
FIG. 2 is a perspective view of the header latch assembly according to the invention.
Figure 3:
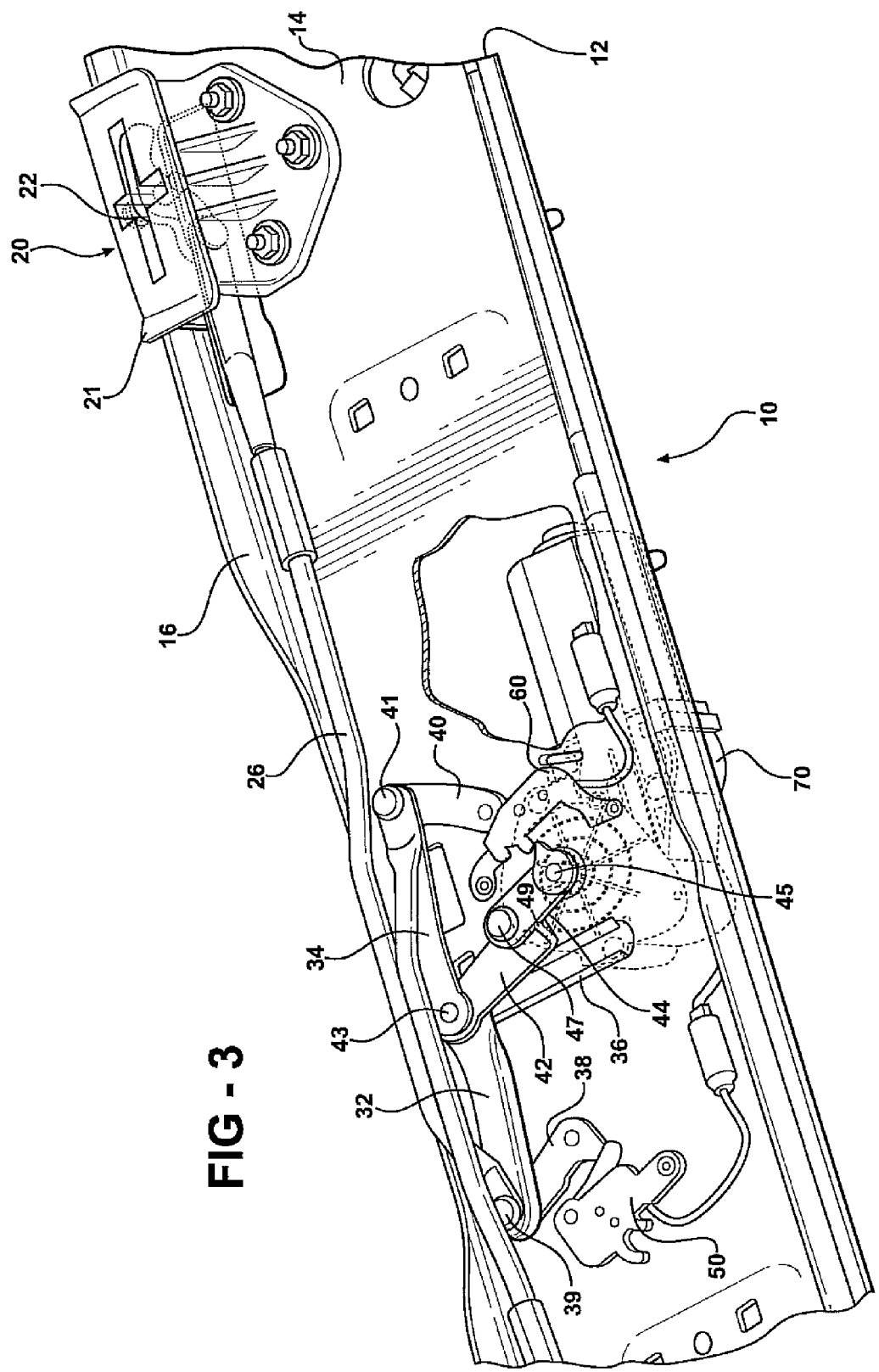
FIG. 3 is an enlarged perspective view of a portion of the header latch assembly of FIG. 2.

Referring to FIGS. 2 and 3, the header latch assembly is generally indicated at 10. The header latch assembly 10 includes a support frame 12 configured to be fixedly secured to the header portion 6 of the windshield 8. The support frame 12 is generally rectangular and extends transversely in the vehicle between opposite sides of the header portion 6. The support frame 12 includes a generally horizontal base wall 14 and an upstanding end wall 16. In the illustrated embodiment, the entire latch assembly is supported on the single support frame 12. Alternatively, each latch mechanism and the actuator mechanism may be supported on either the windshield header or the convertible top by separate support frames or brackets.

A pair of latch mechanisms 20 is disposed on opposite sides of the support frame 12. Each latch mechanism 20 includes a hook 22 for lockingly engaging a receiver (not shown) on the forward end 2 of the top 4. As best illustrated in FIGS. 4-5 where only one side of the latch assembly 10 is shown, each hook 22 is pivotally coupled to one of a pair of housings 21 that is fixedly secured to the support frame 12 for movement between a locked position engaged with a receiver (not shown) on the forward end 2 to latch the top 4 to the header portion 6 and an unlocked position disengaged from the receiver to unlatch the top 4 from the header portion 6.

An actuating mechanism 30 is disposed between the latch mechanisms for actuating the hooks 22 between the locked and unlocked positions. The actuating mechanism 30 utilizes a multi-link assembly having a dual overcenter arrangement for maintaining the hooks 22 in the locked position.

The multi-link assembly includes a pair of middle links 32, 34 each extending between opposite outer and inner ends. The inner ends of the middle links 32, 34 are pivotally coupled to a central pivot 43. The central pivot 43 is slidably coupled to a guide slot 36 formed in the base wall 14 of the support frame 12. Alternatively, the central pivot may be guided by a link or linkage pivotally coupled to the base wall instead of the guide slot. A pair of outer links 38, 40 is pivotally coupled to the base wail 14. Each outer link 38, 40 is pivotally connected by an outer pivot 39, 41 to an outer end of one of the middle links 32, 34. Alternatively, the outer ends of the middle links 32, 34 may be guided by slots formed in the base wall 14 of the support frame 12 instead of the outer links 38, 40.

A center link 42 is pivotally coupled to the central pivot 43. A drive link 44 is pivotally coupled to the base wall 14 by a drive link pivot 45 The drive link 44 is pivotally coupled to the center link 42 by a center link pivot 47. The links 32, 34, 38, 40, 42 of the multilink assembly form a generally "M" or "W"

shape in either the locked position, as shown in FIG. 3, or unlocked position, as shown in FIG. 2.

A pair of connecting rods 24, 26 operatively connects the latch mechanisms 20 and the actuating mechanism 30. The rods 24, 26 overlap each other between the latch mechanisms 20, so that an outer end of each rod 24, 26 is pivotally coupled to one of the hooks 22 on one side of the latch assembly 10 and an inner end of each rod 24, 26 is pivotally coupled to one of the outer pivots 41, 39 on an opposite side of the latch assembly 10. Alternatively, the hooks may be reversed so as to pivot in the opposite direction than as illustrated in the figures during movement between the locked and unlocked position, which would allow the rods to extend from one side of the actuating mechanism to one of the latch mechanisms on the same side.

As best shown in FIG. 3, an actuator 70 is coupled to the drive link pivot 45 for rotatably driving the drive link 44 between the locked position (FIG. 3) and the unlocked position (FIG. 2). The actuator may be of any conventional type known to those having ordinary skill in the art, such as a DC motor or a hydraulic cylinder. The latch assembly 10 may also utilize position sensors 50, 60, which provide feedback to a control system (not shown) that controls the actuator 70. Alternatively, a crank or knob may be used to manually actuate the drive link.

The latch assembly 10 includes a dual overcenter arrangement. More specifically, a first overcenter line is defined between the drive link pivot 45 and the central pivot 43. A first overcenter position is defined by the center link pivot 47 disposed to the right (as viewed from the perspective of FIG. 3) of the first overcenter line 45-43. A second overcenter line is defined between the outer pivots 39, 41. A second overcenter position is defined by the central pivot 43 being positioned above the second overcenter line 39-41. A hard stop 49 is formed in the center link 42 to prevent movement of the center link pivot 47 and central pivot 43 beyond their respective first and second overcenter positions. The dual overcenter arrangement helps to retain the latch mechanisms in the locked position. The dual overcenter arrangement also eliminates the need for tuning or adjustment of the latch assembly after installation in the vehicle. For example, the dual overcenter arrangement allows the use of connecting rods with ends that are directly pivotally coupled to the one of the links of the actuating mechanism and the hooks of the latch mechanisms without the need for turnbuckles that allow the length of the rods to be adjusted for fine tuning of the latch assembly in the vehicle.

The operation of the latch assembly 10 is now described beginning with the top 10 in the extended position, as shown in FIG. 1 and the latch mechanisms 30 in the locked position, as shown in FIGS. 3 and 4. In the locked position, the hooks 22 of the latch mechanisms 30 are lockingly engaged with receivers (not shown) extending from the forward end 2 of the top 4 to secure the header portion 6. The actuating mechanism 30 utilizes a dual-overcenter arrangement which holds the hooks 22 in the locked position.

To move the top 4 to the retracted position (not shown), the latch mechanisms 20 must first be unlocked to release the forward end 2 from the header portion 6. The unlocking sequence begins by moving the drive link 44, either with the actuator 70 or manually, about the drive link pivot 45 in a counterclockwise direction (as viewed in the figures). The counterclockwise direction of the drive link 44 moves the center link pivot 47 out of the first overcenter position to the left of the first overcenter line 43-45 and displaces the center link 42 along the guide slot 36 toward the unlocked position shown in FIG. 2. The central pivot 43 is also moved out of the second overcenter position below the overcenter line 39-41 and displaced along the guide slot 36, so as to cause inward displacement of the middle links 32, 34, outer links 38, 40 and the outer pivots 39, 41.

The inward displacement of the outer pivots 39, 41 causes outward displacement of the connecting rods 24, 26 due to their overlapped orientation. The outward displacement of the connecting rods 24, 26 away from the actuating mechanism 30 causes the hooks 22 to pivot from the locked position in FIG. 4 toward the unlocked position in FIG. 5. With the hooks 22 in the unlocked position, the forward end 2 is released from the header portion 6 and the top 4 may be actuated to the retracted position. The top 4 may be returned to the extended position and locked to the header portion 6 by reversing the aforementioned steps.

The invention has been described in an illustrative manner. It is, therefore, to be understood that the terminology used is intended to be in the nature of words of description rather than of limitation. Many modifications and variations of the invention are possible in light of the above teachings. For example, the latch assembly as described herein may also be used to releasably lock adjacent panels of a hard top to each other, or a portion of a top to another part of the vehicle body. Thus, within the scope of the appended claims, the invention may be practiced other than as specifically described.

I claim:

1. A latch assembly for latching together a first part and a second part of a convertible top system of a vehicle, wherein at least a portion of the convertible top system is movable between an extended position for covering a passenger compartment and a retracted position disposed in a storage space behind the passenger compartment, said latch assembly comprising:

a pair of latch mechanisms disposed on the first part, each latch mechanism having a hook that is movable between a locked position engaged with a receiver on the second part to latch the first and second parts together and an unlocked position disengaged from the receiver to unlatch the first and second parts from each other; and an actuating mechanism disposed on the first part between the latch mechanisms for moving the hooks between the locked and unlocked positions, the actuating mechanism including a multi-link assembly movable including:

a pair of middle links each extending between opposite inner and outer ends, and a central pivot pivotally interconnecting the inner ends of the middle links, the middle links defining a first overcenter mechanism having an overcenter position wherein the central pivot is in an overcenter position with respect to the outer ends of the middle links;

a center link pivotally coupled to at least one of the middle links and a drive link pivotally coupled to the center link by a center link pivot, the center link and drive link defining a second overcenter mechanism having an overcenter position wherein the center link pivot is in an overcenter position with respect to opposite ends of the center link and drive link;

wherein the first and second overcenter mechanisms are each in the overcenter position when the hooks are in the locked position.

2. A latch assembly as set forth in claim 1, wherein one of the first and second parts is a convertible top and the other of the first and second parts is a vehicle.

3. A latch assembly as set forth in claim 2, wherein the first part is the vehicle and the second part is the convertible top.

4. A latch assembly as set forth in claim 1, wherein the multi-link assembly generally forms a W-shape in at least one of the locked or unlocked positions.

5. A latch assembly as set forth in claim 1 including a support frame that supports the actuating mechanism and the latch mechanisms on the first part.

6. A latch assembly as set forth in claim 5, wherein the central pivot is slidably coupled to a guide slot formed in the support frame.

7. A latch assembly as set forth in claim 5, wherein the multi-link assembly further includes a pair of outer links being pivotally coupled to the support frame, and a pair of outer pivots pivotally interconnecting the outer ends of the middle links to the outer links.

8. A latch assembly as set forth in claim 1, wherein the center link is pivotally coupled to the central pivot.

9. A latch assembly as set forth in claim 8, wherein the drive link is pivotally coupled to the support frame by a drive link pivot.

10. A latch assembly as set forth in claim 9, wherein a first overcenter line is defined between the drive link pivot and the central pivot, the first overcenter mechanism being in the overcenter position when the center link pivot is moved to a first overcenter position relative to the first overcenter line to maintain the hooks in the locked position.

11. A latch assembly as set forth in claim 7, wherein a second overcenter line is defined between the outer pivots, the second overcenter mechanism being in the overcenter position when the central pivot is moved to a second overcenter position relative to the second overcenter line to maintain the hooks in the locked position.

12. A latch assembly as set forth in claim 7, further including connecting rods coupling the hooks to the outer ends of the middle links, each connecting rod extending between one of the latch mechanisms on one side of the actuating mechanism and one of the outer ends on an opposite side of the actuating mechanism.

13. A latch assembly as set forth in claim 12, wherein each rod has a length that is fixed and nonadjustable between the one of the latch mechanisms and the one of the outer ends.

14. A latch assembly as set forth in claim 1 including an actuator operatively coupled to the drive link for actuating the latch mechanisms between the locked and unlocked positions.

15. A latch assembly as set forth in claim 8, wherein the outer links, middle links and center link generally form a W-shape in at least one of the locked or unlocked positions.

16. A latch assembly as set forth in claim 9, further including an actuator coupled to the drive link via the drive link pivot for actuating the latch mechanisms between the locked and unlocked positions.

17. A latch assembly as set forth in claim 16, wherein the actuator is an electric motor.

18. A latch assembly as set forth in claim 8, wherein the middle links are generally colinear in the locked position and with the middle and center links generally form a W-shape.

19. A latch assembly as set forth in claim 1, wherein the support frame includes a base wall supporting both the latch mechanisms and the actuating mechanism.

20. A latch assembly as set forth in claim 19, wherein the hooks are pivotally coupled to a housing fixedly secured to the base wall for movement of the hooks between the locked and unlocked positions.

* * * * *

UNITED STATES PATENT AND TRADEMARK OFFICE
CERTIFICATE OF CORRECTION

PATENT NO.         : 7,581,777 B2
APPLICATION NO.    : 11/616605
DATED              : September 1, 2009
INVENTOR(S)        : Frank Neubrand Page 1 of 1

It is certified that error appears in the above-identified patent and that said Letters Patent is hereby corrected as shown below:

Col. 1, line 50: replace "to-ether" with --together--

Signed and Sealed this

Twenty-fourth Day of November, 2009

David J. Kappos
*Director of the United States Patent and Trademark Office*